United States Patent [19]

Vander Pol

[11] Patent Number: 4,665,782
[45] Date of Patent: May 19, 1987

[54] BEARING ARRANGEMENT FOR PORTABLE LATHE

[75] Inventor: Jerald Vander Pol, Eldorado Hills, Calif.

[73] Assignee: Tri Tool Inc., Rancho Cordova, Calif.

[21] Appl. No.: 817,094

[22] Filed: Jan. 8, 1986

[51] Int. Cl.⁴ .............................................. B23B 5/08
[52] U.S. Cl. ...................................... 82/4 C; 82/4 R
[58] Field of Search ................................ 82/4 C, 4 R

[56] References Cited

U.S. PATENT DOCUMENTS

| | | | |
|---|---|---|---|
| 4,397,202 | 8/1983 | Mayfield et al. | 82/4 C |
| 4,418,591 | 12/1983 | Astle | 82/4 C |
| 4,483,522 | 11/1984 | Nall et al. | 82/4 C |

FOREIGN PATENT DOCUMENTS 1450772  9/1976  United Kingdom ................. 82/4 C

*Primary Examiner*—Nicholas P. Godici
*Assistant Examiner*—Jerry Kearns
*Attorney, Agent, or Firm*—Bacon & Thomas

[57] ABSTRACT

A portable lathe tool includes fixed and rotating split rings, the fixed ring arranged to be secured to a pipe workpiece, the rotating ring being relatively rotatable with respect thereto for carrying a tool capable of performing a machining operation on the workpiece as it is driven around the circumference of the latter. A bearing arrangement for supporting the relatively rotating ring on the fixed ring is disclosed as comprising a bearing ring having a sloping bearing surface for engaging the rear end area of the rotating ring for axially, radially and rotationally locating and guiding the rotating ring relative to the fixed ring. An adjustment system is provided for accurately locating and adjusting the position of the bearing ring relative to the fixed ring to permit compensation for wear and dimensional variations.

7 Claims, 7 Drawing Figures

BEARING ARRANGEMENT FOR PORTABLE LATHE

BACKGROUND OF THE INVENTION

1. Field of the Invention

This invention relates to portable lathes and in particular to a bearing arrangement for a portable lathe.

2. Description of Related Art

Portable lathe tools of the type embodying this invention are described, for example, in U.S. Pat. No. 4,418,591 and British Patent No. 1,450,774, published Sept. 29, 1976. A rotary bearing arrangement for the tool carrying head of the lathe is disclosed in the U.S. Patent while a ring with a sliding bearing surface is disclosed in the British patents.

With the fixed ring bearing arrangement such as is disclosed in the British patent, it is difficult or impossible to compensate for wear between the relatively sliding elements constituting the bearing surfaces for the tool head. Moreover, accommodation of dimensional tolerance variations also is problematic due to the fact that the various bearing elements are relatively fixed in an axial sense relative to each other.

BRIEF SUMMARY OF THE INVENTION

The present invention provides an improved ring type bearing arrangement for a rotary tool head conceptually similar to that illustrated in the above referenced British patent and in particular provides an adjustment system to permit the bearing ring for the tool head to be axially adjusted to accommodate for wear and to more precisely locate the rotating ring portion of the tool relative to the relatively fixed, workpiece engaging portion of the tool.

More specifically, the present invention provides an adjusting system for precisely locating the bearing ring relative to the tool head and the fixed tool structure so that the relatively rotating tool head can be precisely located and guided in axial, radial and rotational directions relative to the fixed tool housing.

BRIEF DESCRIPTION OF THE DRAWINGS

With reference to the appended drawings.

DESCRIPTION OF THE PREFERRED EMBODIMENT OF THE INVENTION

Figure 1:
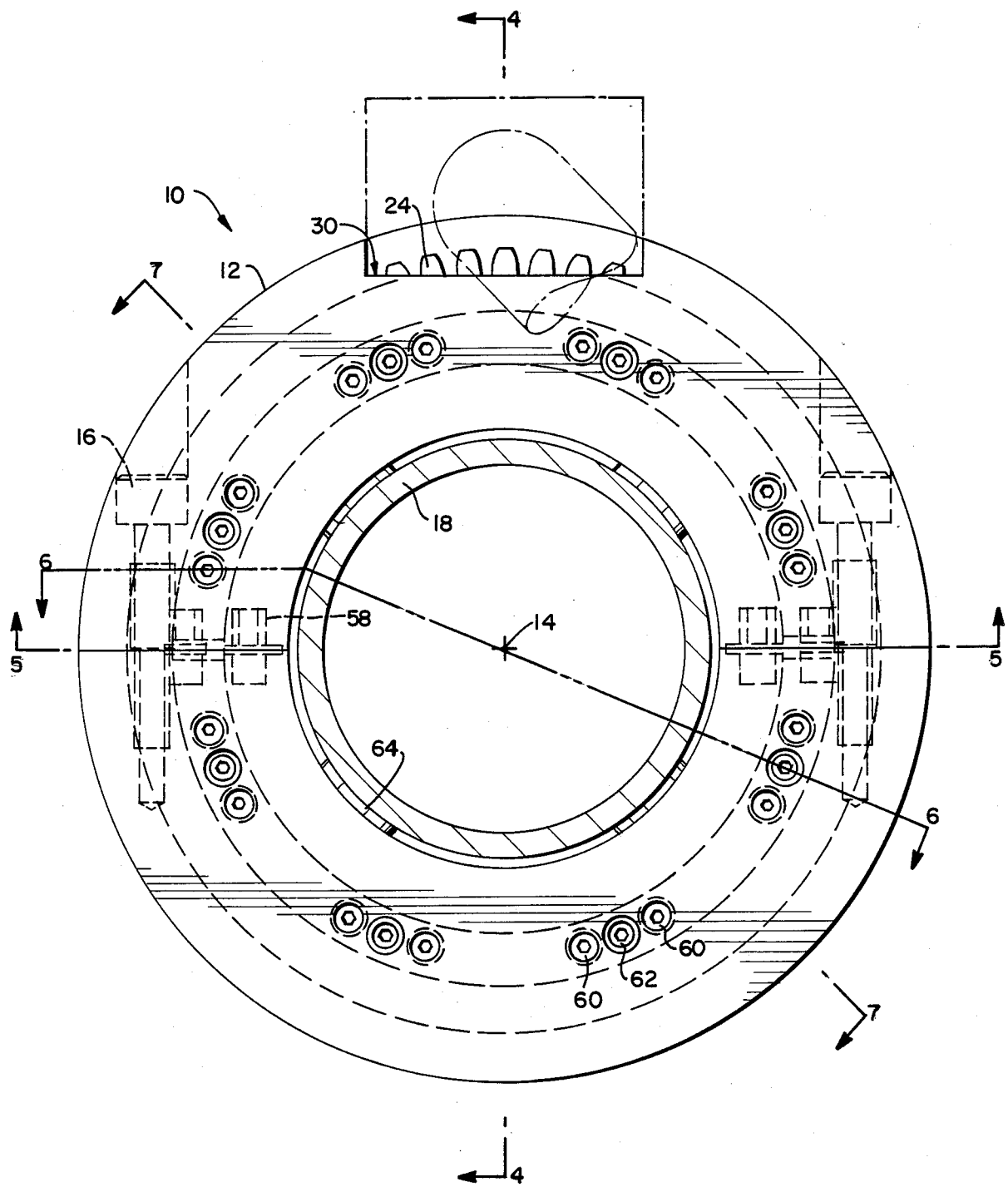
FIG. 1 shows a rear elevation view of a portable lathe tool embodying the invention.
Figure 2:
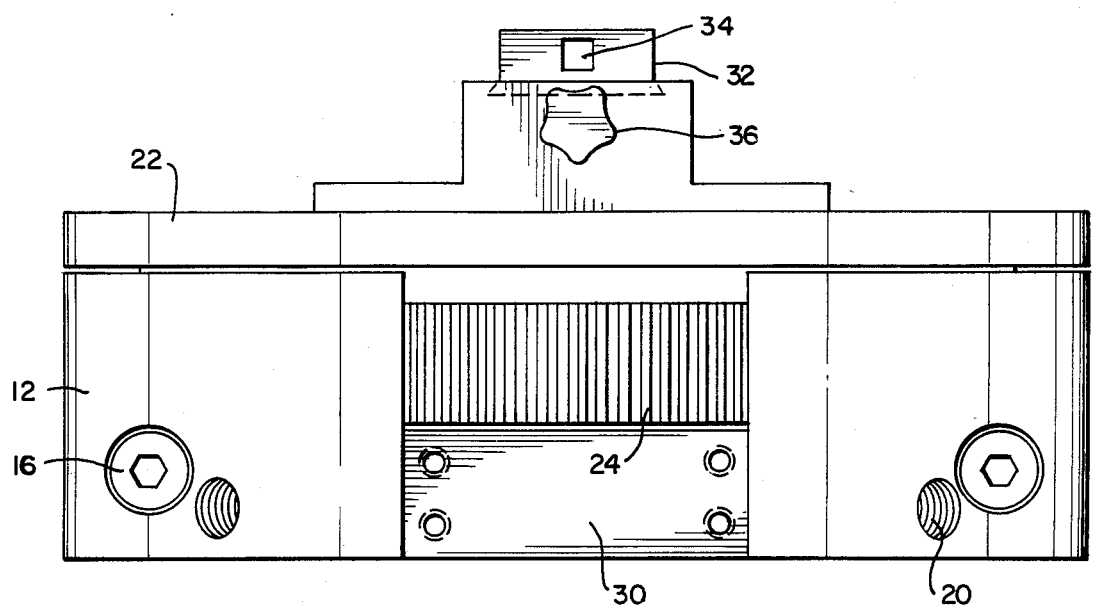
FIG. 2 is plan view of the invention taken from the top of FIG. 1.
Figure 5:
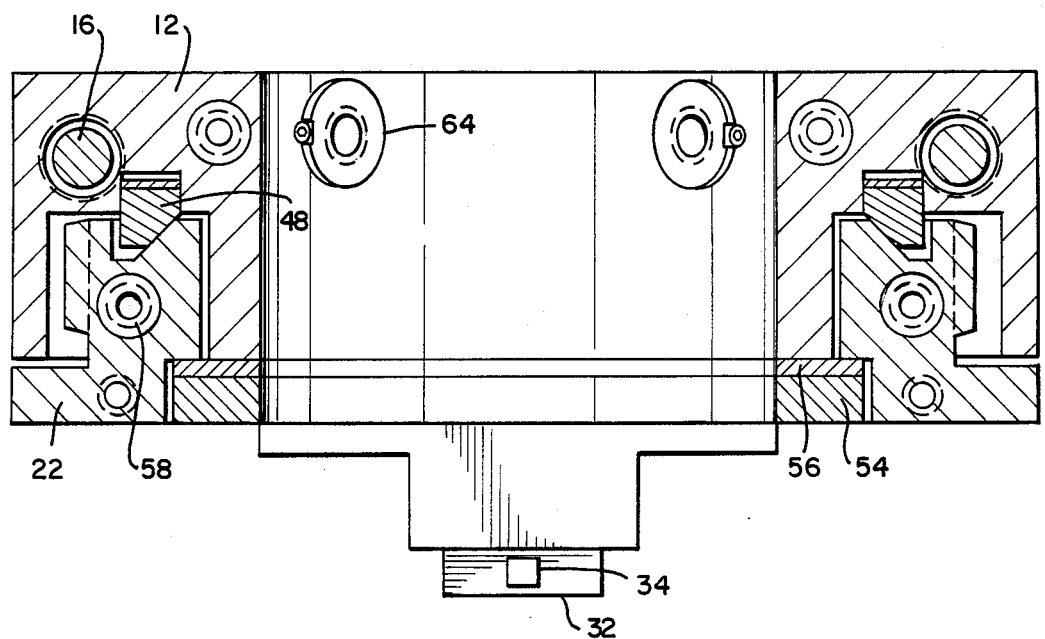
FIG. 5 is a section view taken along line 5—5 of FIG. 1.
Figure 3:
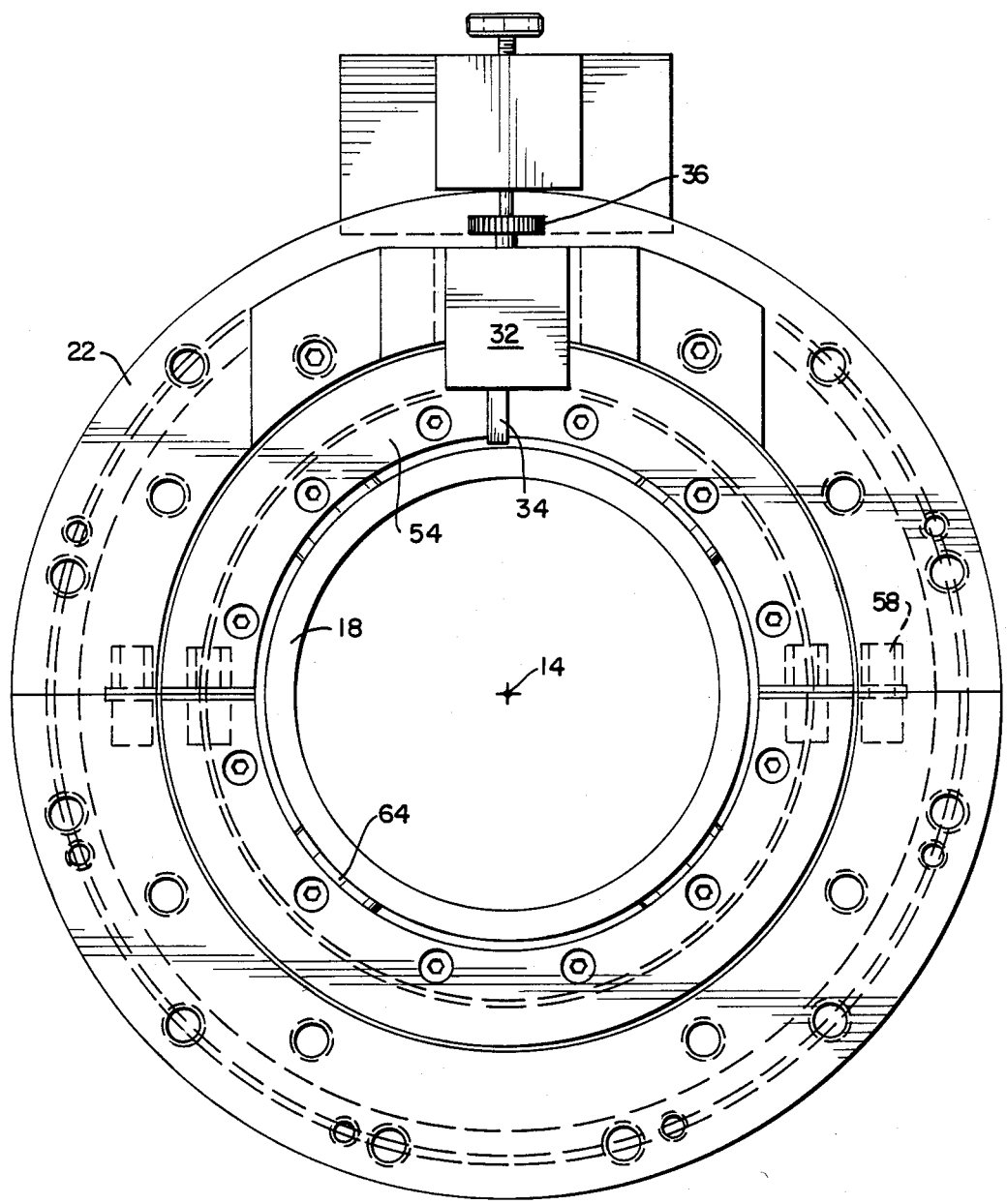
FIG. 3 is a front elevation view of the tool shown in FIG. 1.

With reference to the drawings, FIGS. 1-3 show a portable lathe tool 10 embodying the invention to be more particularly described below. As shown in these views, the tool comprises a first or fixed annular ring 12 having a longitudinal central axis 14, the ring 12 being divided in two halves normally retained together by suitable hinge and fastener means such as are generally illustrated at 16 and which are generally conventional in portable lathe tools for permitting the tool to be split and placed over a pipe workpiece 18 in preparation a machining operation on the pipe. The pipe workpiece (not illustrated here) normally is disposed centrally along the access 14 and retained within the ring 12 by clamping pads that will be more particularly described below with reference to FIG. 7. In FIG. 2, threaded apertures 20 are shown for receiving conventional actuating bolts for work piece engaging pads that are disposed around the periphery of ring member 12 for locating and centering the work piece relative to the ring member 12.

Figure 4:
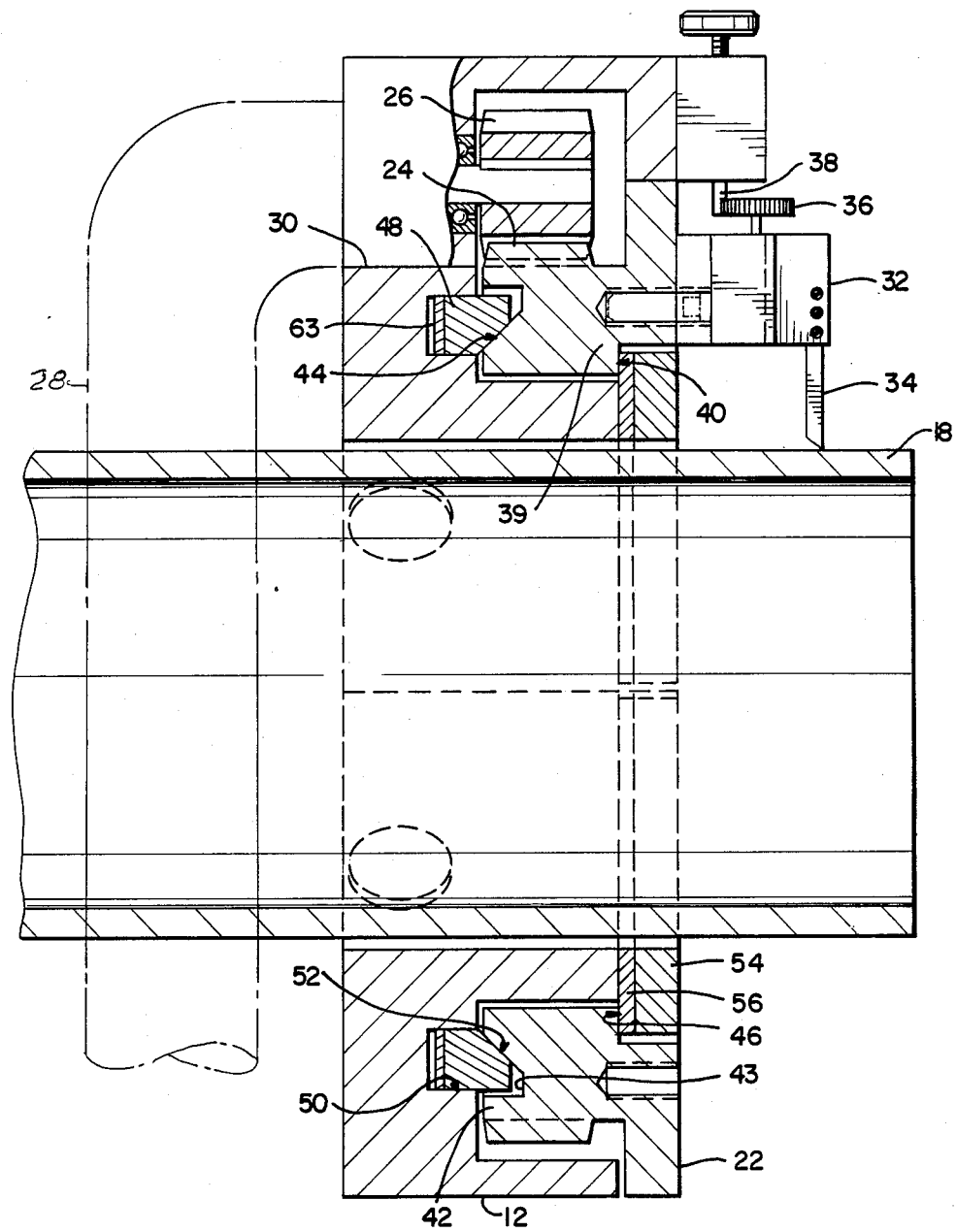
FIG. 4 is a section view taken along line 4—4 of FIG. 1.

As shown in FIG. 4, a second or rotating annular ring member 22 (referred to as the rotating tool head in the art) is rotatably mounted on ring member 12 and includes outer gear teeth 24 engagable with pinion 26 of drive motor 28 normally mounted on ring 12 at mounting area 30 in FIGS. 1 and 2. The drive motor is only schematically illustrated in FIG. 4 to show its overall relationship with the portable lathe tool. Ring member 22 includes a central longitudinal axis that is coincident with axis 14 so that the second ring 22 rotates concentrically relative to ring 12.

A suitable tool carrying head 32 is normally fastened to the forward face (towards the right as shown in FIG. 4) of ring 22 and includes appropriate means for securing and feeding a tool bit 34 relative to the ring 22 for carrying out turning operations on a pipe workpiece centrally located within the annular openings of the rings 12,22. The feed means for the tool bit 34, for example, can comprise a conventional star wheel 36 that engages a relatively fixed pin 38 mounted on ring 12. Such tool carrier and feed systems are generally conventional and do not constitute per se a material part of the present invention.

The ring 22 includes forward and rearward portions 39, 42, respectively, with the rearward portion 42 including an annular groove 43 including a bearing surface 44 that is inclined relative to the axis 14. Forward portion 39 includes a forward bearing surface 40 cooperating with a bearing surface 46 on the forward portion of the ring 22 for locating and guiding ring 22 relative to ring 12 in an axially forward direction.

A third or adjusting ring member 48 is mounted on ring 12 within an annular groove 50 and is axially slidable within said groove so that an inclined bearing surface 52 of the third ring member 48 engages the rearward bearing surface 44 of ring 22. The sloping bearing surfaces 44,52 are contiguous with each other during normal operation of the portable lathe tool embodying this invention and the position of the third ring 48 is adjusted so that when bearing surfaces 44,52 are contiguous, the forward thrust bearing surfaces 40,46 are also contiguous so that the ring 22 is precisely located relative to ring 12 in axial, radial and rotational directions. The sloping bearing surface 52 of third ring member 48 is configured so that it precisely mates with the rearward bearing surface 44 of ring member 22 so that the latter is maintained with its axis concentric with longitudinal axis 14 during operation of the tool.

The thrust bearing surface 56 of ring 12 preferably is provided on or associated with a stop ring member 54 which may include an integral thrust bearing surface 46 or the bearing surface 46 may be provided on a separate ring bearing element 56 which itself provides the thrust bearing surface 46.

The ring 22, like ring 12, is divided into at least two halves retained by appropriate fastener means at 58 and all other ring elements, for example rings 48, 54 and 56, are likewise split so that the entire lathe tool assembly can be opened for placement over a continous pipe workpiece in a conventional manner.

Figure 6:
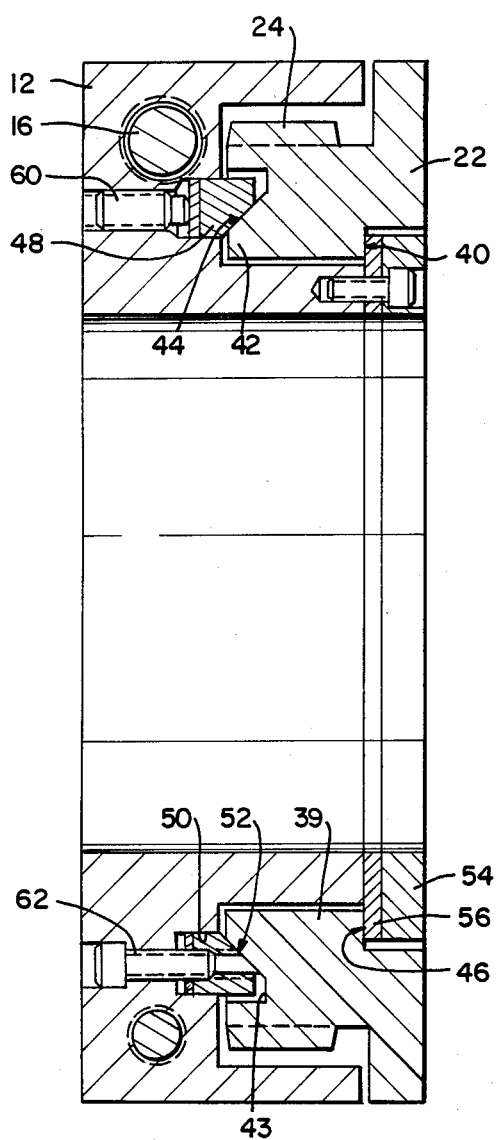
FIG. 6 is a section view taken along line 6—6 of FIG. 1.

As shown in FIG. 6, the third ring member 48 is axially moveable with in slot 50 by axial adjusting means comprising set screws 60,62. Set screws 60 are arranged in an annular pattern around axis 14 (see FIG. 1) in pairs, with second set screw 62 disposed between pairs of the first set screws 60. Set screws 60 are threadedly engaged to fixed ring 12 while set screws 62 are rotationally received within apertures in ring 12 and threaddedly engaged with third or adjusting ring 48. Set screws 60, when rotated in a single direction, positively drive the third or adjusting ring 48 forwardly while rotation of set screws 62 in a single direction positively drive ring 48 rearwardly. Rotation of screws 60 and 62 in the reverse direction, of course, have the opposite effect except that reverse rotation of screws 60 provide rearward clearance for the ring 48. A hardened ring 63 or the like can be provided behind ring 48 if desired to react loads from set screws 60.

In operation, set screws 60 are normally rotated to advance ring 48 so that bearing surfaces 44 and 52 engage each other to center ring 22 relative to ring 12 and to advance the forward thrust bearing surface 40 until it engages thrust bearing surface 46 in slidingrelationship. It will be apparent that the position of third ring 48 can be adjusted at will to accommodate wear and dimensional variations as well as thermal conditions.

Rotation of rotary ring 22 relative to fixed ring 12 will now occur with the thrust bearing surfaces 46,40 serving to locate ring 22 in an axially forward direction, while mating bearing surfaces 44,52 serve to locate the ring 22 in axially rearward, rotational and radial directions.

Figure 7:
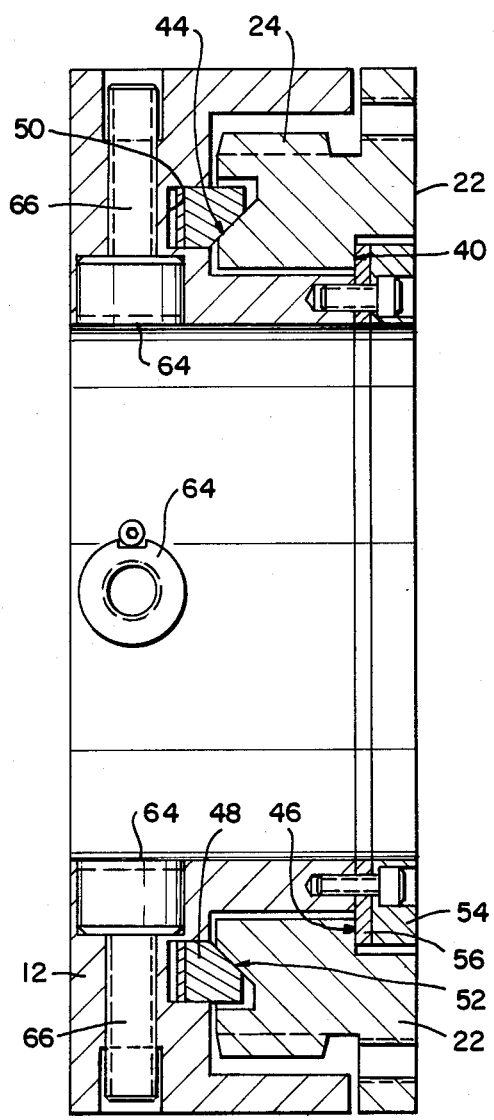
FIG. 7 is a section view taken along line 7—7 of FIG. 1.

As seen in FIG. 7, mounting pads 64 are mounted on fixed ring 12 by threaded bolts 66. The mounting pads are generally conventional and are arranged to precisely locate ring 12 on a tubular type workpiece disposed within the annulus of ring 12 so that axis 14 of the ring is generally colinear with such a workpiece and is rigidly secured relative thereto so that a machining operation can be carried out on the workpiece in a precise manner.

The various bearing surfaces described herein may be formed from self-lubricating, lubricant-impregnated material or may be formed of precision machined surfaces that are provided with a suitable source of lubricant.

While a preferred embodiment of the invention has been described and illustrated herein, it is to be understood that the same has been provided as an illustration of the preferred embodiment and is not intended to be limiting in any respect of the scope of the invention, which is defined in the claims herein below.

What is claimed is:

1. A portable lathe tool comprising:
    a first ring member arranged to be secured to a workpiece and having a central longitudinal axis and axially opposed ends;
    a second ring member for carrying a cutter tool, including a central longitudinal axis concentric with the longitudinal axis of said first ring member and mounted on one of said opposed ends of said first ring member for rotation relative thereto about the central axis of the second ring member, the latter having axially opposed forward and rearward end portions;
    adjustable bearing means for locating and guiding said second ring member relative to the first ring member in axial, radial and rotational directions;
    said adjustable bearing means comprising an axially moveable third ring member concentric with said first ring member and disposed adjacent the rear end portion of second ring member;
    said third ring member including an inclined radial and thrust bearing surface on its forward end that engages, locates and guides the rear end portion of said second ring member in axial, radial and rotational directions, said rearward end portion of said second ring member including a radial and thrust bearing surface corresponding in configuration to said third ring radial and thrust bearing surface;
    means for axially moving the third ring member along the longitudinal axis of the first ring member in at least a forward direction;
    said second ring member including a forward thrust bearing surface;
    said first ring member including a forward thrust bearing surface corresponding in configuration and shape to said second ring member forward thrust bearing surface;
    said forward thrust bearing surfaces of said first and second ring members locating and guiding said third ring member in at least an axial direction.

2. A portable lathe tool as claimed in claim 1, said means for axially moving the third ring member comprising means for positively moving the third ring member both axially forwardly and axially rearwardly.

3. A portable lathe tool as claimed in claim 2, wherein said means for positively moving the third ring member both axially forwardly and axially rearwardly comprise separate actuating members.

4. A portable lathe tool as claimed in claim 3, wherein said separate actuating members are threaded elements mounted on the first ring member in an annular array around the longitudinal axis of the first ring member.

5. A portable lathe tool as claimed in claim 4, wherein said separate actuating members comprise (i) a first set screw or screws threadedly engaged with the first ring member for positively driving the third ring member forwardly when advanced relative to the first ring member; (ii) a second set screw or screws rotationally supported by the first ring member and threadedly engaging said third ring member for driving the latter rearwardly when rotated relative to the first ring member.

6. A portable lathe tool as claimed claim 5, said first and second sets screws comprising multiple set screws alternating with each other in an annular pattern around the axis of the first ring member.

7. A portable lathe tool as claimed in claim 6, said first set screw or screws being disposed around the longitudinal axis of said first ring member in circumferentially spaced pairs and said second set screw or screws being disposed between each of said spaced pairs of first set screws.

* * * * *